United States Patent Office 2,759,793
Patented Aug. 21, 1956

2,759,793

SEPARATING HAFNIUM FROM ZIRCONIUM

Bryan Alfred Jack Lister and James Francis Duncan, Strand, London, England

No Drawing. Application February 21, 1951,
Serial No. 212,029

14 Claims. (Cl. 23—19)

This invention relates to the separation of zirconium and hafnium by employment of ion exchange methods. See also copending application Serial No. 212,030, filed February 21, 1951.

Some degree of separation of zirconium and hafnium by such methods has been reported by Street and Seaborg (J. A. C. S. 70, 4268 (1948)) using a method based on elution by 6N hydrochloric acid from a column of cation exchange material known as "Dowex 50" and consisting of a sulphonated polystyrene resin; and by Kraus and Moore (J. A. C. S. 71, 3263 (1949)) using a mixture of hydrofluoric and hydrochloric acids to elute a mixture of the two elements from a column of anion exchange material.

For certain purposes zirconium with very low hafnium content is a requirement, and methods hitherto available have not simply achieved the necessary degree of purity.

The object of the invention is to provide a method of separating hafnium from zirconium whereby the latter may be prepared in a pure state substantially free from hafnium.

According to the invention substantially complete separation of zirconium from hafnium may be obtained by elution of ion exchange material, on which compounds of the elements are adsorbed, with an approximately normal solution of sulphuric acid. Preferably the acid concentration is between 0.8 N and 1.2 N and should not exceed substantially 1.5 N. Increase of the concentration of sulphate ion in the eluting solution by presence of a soluble sulphate, such as sodium sulphate, has been found to be advantageous.

The preferred ion exchange materials for use according to the invention are sulphonated polystyrene resins which may be prepared, for example, by the method described in United States Patent No. 2,366,007. Resins which may be employed are "Dowex 50" and "Zeokarb 225." The ion exchange material is preferably arranged in the form of a column in a tube through which solutions for treatment and eluting solutions are passed.

The following are examples of preferred ways of carrying the invention into effect.

Example 1

A column of ion exchange resin known as "Dowex 50" or "Zeokarb 225" 4 feet long is arranged in an inert tube of one inch internal diameter, the tube having an internal step or constriction to support a perforated plate on which the resin is supported. The resin column is washed with mineral acid to convert it to acid form. A 0.01 to 0.1 M solution in 1 to 2 N hydrochloric, nitric or perchloric acid of zirconium oxychloride or other soluble zirconium salt and associated hafnium impurity (in amount equal to about two percent by weight of the zirconium) was seeded with a tracer quantity of radioactive zirconium (Zr 95) and hafnium (Hf 181) and introduced into the top of the column. A total amount of solution equivalent to 10 gm. of zirconia could be treated by the quantity of resin in the column at one time. After the solution had passed through the column, aqueous N sulphuric acid was passed through the column and the eluate was continuously monitored by means of a Geiger-Müller tube and appropriate amplifier. External counting of the column was also carried out.

When volume of eluate was plotted against radioactivity as indicated by the eluate counter two distinct and widely separated bands were obtained, the zirconium responsible for the first band passing quite rapidly from the column and the hafnium resulting in the second band passing much more slowly. The eluate collected during the first band contained from 98 to 99 per cent of the zirconium originally present and oxide precipitated from the solution showed on spectrographic analysis less than 0.01 per cent of hafnium.

Hafnium remaining in the column after collection of the zirconium was readily removed by eluting with a complexing agent for the hafnium, preferably dilute hydrofluoric acid of for example 0.05 per cent concentration. Dilute aqueous oxalic acid may be used as alternative. After washing the column with mineral acid, a further batch of zirconium salt could be treated. If conditions as to concentrations and amounts are kept the same, N sulphuric acid eluate in amount equal to that corresponding to the first band could be collected and would be found to contain substantially all the zirconium of the purity specified above.

As an alternative to the above method, zirconium and its attendant hafnium impurity may be brought into solution in 0.8 to 1.2 N aqueous sulphuric acid and the solution passed on to a column of "Dowex 50" resin, or similar ion exchange resin, previously rendered acid by treatment with normal sulphuric acid. Further sulphuric acid of the normality used for the solution may then be passed through the column to complete the elution. Eluate is collected throughout the run and the first fractions of it will contain zirconium having a hafnium content less than 0.05 per cent. Where hydrofluoric acid is used to elute hafnium, it may be found preferable to employ a perspex or Lucite tube to hold the cationic exchange material.

From runs with other eluting agents it is concluded that the separation obtained is due to difference in complexing behaviour. Thus with 3 N perchloric acid, a solution in which zirconium is believed to be little complexed, the zirconium and hafnium show very little tendency to move down the column. With 3 N hydrochloric acid considerable but inadequate separation was achieved and the hafnium was eluted first, and higher concentrations of acid gave smaller separations. 3 N nitric acid showed no separation, although the one band observed moved down the column at the same rate as did the zirconium band when 3 N hydrochloric acid was used. The latter is in agreement with an observation by Connick and McVey (J. A. C. S. 71, 3182 (1949)) that zirconium is equally complexed in solutions of 2 N hydrochloric and nitric acids.

We claim:

1. A method of separating zirconium and hafnium which comprises effecting adsorption of salts of the metals on a cation exchange material and eluting the cation exchange material and the adsorbate with sulphuric acid of concentration 0.8 N to 1.2 N, and segregating the initial eluate containing zirconium.

2. A method of recovery of zirconium substantially free from hafnium from cation exchange material on which the substances are adsorbed, the method comprising eluting the cation exchange material with 0.8 N to 1.5 N sulphuric acid and segregating initial eluate containing zirconium.

3. A method of separating zirconium from hafnium which comprises bringing a solution of salts of the metals into contact with a sulphonated polystyrene ion exchange resin to bring about adsorption of the metals on the resin, eluting the said resin with 0.8 N to 1.5 N sulphuric acid to recover zirconium substantially free from hafnium and then removing hafnium adsorbed on the resin by eluting with a complexing agent for the hafnium.

4. A method of recovery of zirconium substantially free from hafnium wherein a solution of salts of the metals in aqueous mineral acid is brought into contact with sulphonated polystyrene ion exchange resin to bring about adsorption of the metals by the said resin and eluting the resin with 0.8 to 1.5 normal sulphuric and collecting separately the initial part of the eluate containing the greater part of the zirconium without appreciable quantity of hafnium.

5. A method of recovering zirconium substantially free from hafnium wherein a 0.01 M solution of zirconium oxychloride and attendant hafnium impurity in substantially 2 N mineral acid is brought into contact with sulphonated polystyrene ion exchange resin in the acid condition to bring about adsorption of the metals on the said resin, eluting the resin with substantially normal aqueous sulphuric acid and collecting separately the initial eluate containing the greater part of the zirconium without appreciable content of hafnium.

6. A method according to claim 5 wherein the treated solution of zirconium oxychloride is substantially 2 N in hydrochloric acid.

7. A method according to claim 5 wherein the treated solution of zirconium oxychloride is substantially 2 N in nitric acid.

8. A method according to claim 5 wherein the treated solution of zirconium oxychloride is substantially 2 N in perchloric acid.

9. A method of producing zirconium substantially free from hafnium which comprises passing a solution in 0.8 to 1.5 N sulphuric acid of zirconium containing hafnium into contact with a mass of sulphonated polystyrene ion exchange resin, collecting zirconium-containing solution leaving the resin mass, eluting the resin mass with 0.8 to 1.5 N sulphuric acid and collecting initial eluate containing zirconium substantially free from hafnium.

10. A method of producing zirconium substantially free from hafnium which comprises passing a 0.8 to 1.5 N sulphuric acid zirconium-containing solution through a column of sulphonated polystyrene ion exchange resin, collecting substantially hafnium-free zirconium-containing solution leaving the column, eluting the column of resin with 0.8 to 1.5 N sulphuric acid collecting initial eluate containing zirconium substantially free from hafnium.

11. A method of recovering zirconium substantially free from hafnium from an impure zirconium salt wherein the impure zirconium salt in solution in aqueous nitric acid is passed through a column of sulphonated polystyrene ion exchange resin in acid condition to bring about adsorption of the metals zirconium and hafnium on the said resin, the column of resin is eluted with 0.8 M to 1.5 M aqueous sulphuric acid and the initial portion of eluate from the column of resin containing the greater part of the zirconium with a substantially reduced hafnium content is collected separately.

12. A method according to claim 11 wherein hafnium retained by the resin column is subsequently eluted by means of a complexing agent for the hafnium.

13. A method according to claim 11 wherein hafnium retained by the column of resin is subsequently eluted with an aqueous solution of oxalic acid.

14. A method of recovering zirconium substantially free from hafnium, wherein impure zirconium salt in solution in aqueous nitric acid is passed through a column of a cation exchange material to bring about adsorption of the metals zirconium and hafnium on the ion exchange material and the latter is eluted with 0.8 M to 1.5 M sulphuric acid to remove zirconium from the ion exchange material, the elution is discontinued when the greater part of the zirconium substantially free from hafnium has been eluted, the eluate is collected, and the hafnium retained on the ion exchange material is eluted by means of a solution of a complexing agent for hafnium and the hafnium-containing eluate is collected separately.

References Cited in the file of this patent

Industrial and Engineering Chemistry, vol. 40, pages 1350–5 (1948).

Ayres: Purification of Zirconium by Ion Exchange Columns, MDDC, 1026, June 30, 1947; U. S. Atomic Energy Commission.

Street et al.: The Ion Exchange Separation of Zirconium and Hafnium, AECD 2435, October 11, 1943; U. S. Atomic Energy Commission, 2 pages.